Aug. 5, 1952     E. C. KARP     2,606,049
WHEEL MOUNTING FOR BAND SAWS
Filed Feb. 15, 1949     2 SHEETS—SHEET 1
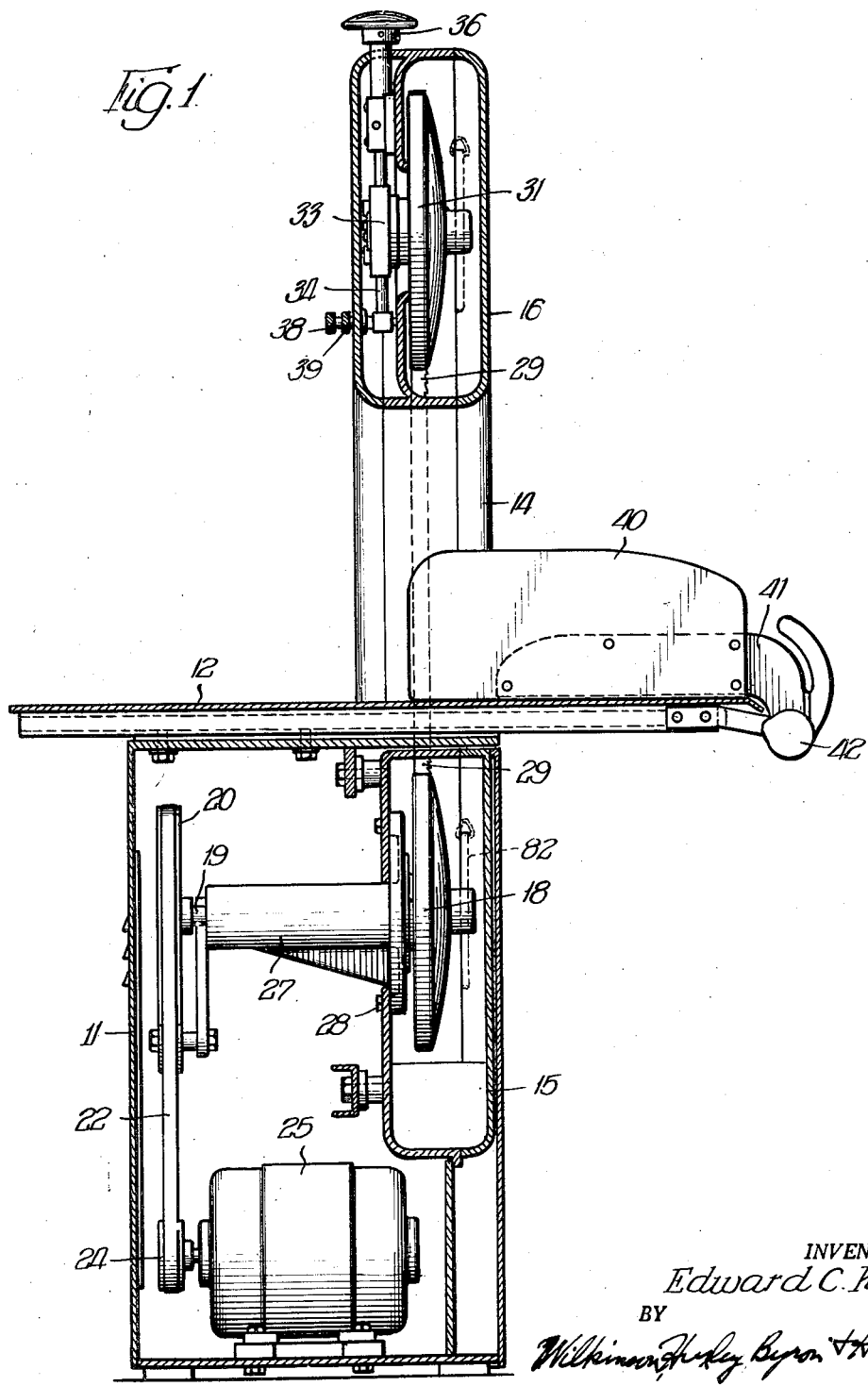
INVENTOR.
Edward C. Karp.
BY Wilkinson, Huxley, Byron & Hume
ATTYS.

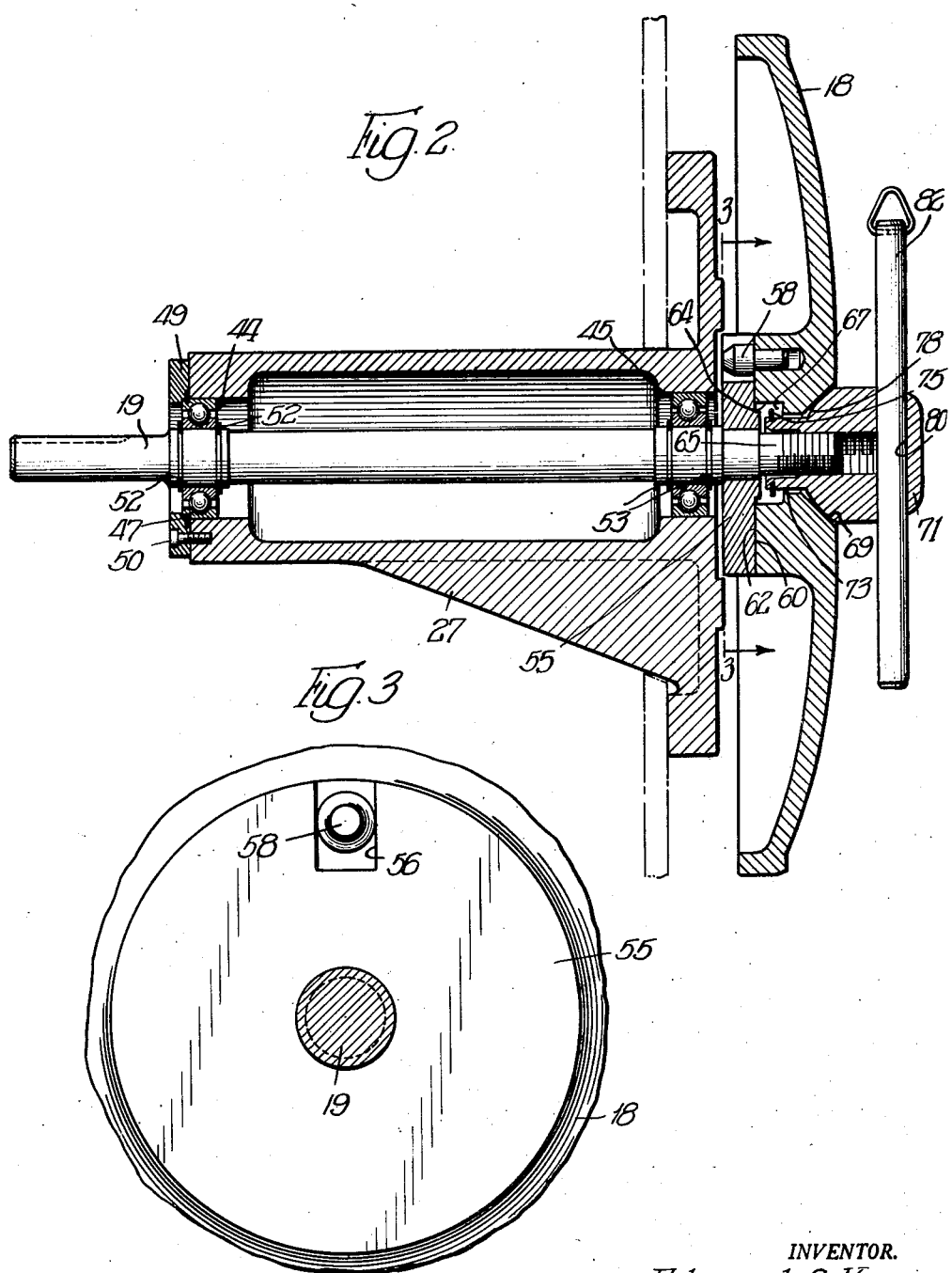

Patented Aug. 5, 1952

2,606,049

UNITED STATES PATENT OFFICE 2,606,049

WHEEL MOUNTING FOR BAND SAWS

Edward C. Karp, Belvidere, Ill., assignor to Sanitary Scale Company, Belvidere, Ill., a corporation of Illinois Application February 15, 1949, Serial No. 76,474

1 Claim. (Cl. 287—53)

This invention relates to a new and improved wheel mounting for band saws or the like and more particularly to a mounting especially adapted for use in connection with band saws of the type used for sawing meats.

Saws of this character comprise the usual upper and lower wheels about which the band saw passes. One wheel, usually the lower wheel, is a driven wheel while the other wheel is an idler. Various forms of mountings for the wheels are provided, as, for example, those shown in my prior application Serial No. 684,510, filed July 18, 1946, now abandoned.

Saws used for working on food products require thorough cleaning after use and, consequently, parts which come directly in contact with the food, as well as those to which particles of food may be transferred by the moving parts, must be readily dismountable for cleaning.

Saws of this character operate at high speed and, consequently, the wheels carrying the saw band rotate rapidly in operation. Therefore, these wheels require exact alignment which must be maintained in use.

It is an object of the present invention to provide a new and improved wheel mounting for band saws.

It is a further object to provide such a wheel which is readily dismountable for cleaning.

It is another object to provide a wheel mounting such that when the wheel is removed the wheel bearings are left as an integral part of the saw while the wheel itself is detachable as a separate unit for washing and even immersion with no possibility of damage to the bearings as is the case in most conventional designs.

It is also an object to provide a wheel and mounting wherein a minimum of coacting surfaces need be manufactured to critical tolerances.

It is an additional object to provide a wheel and mounting which is simple in design and manufacture and adapted for commercial production and use.

Other and further objects will appear as the description proceeds.

I have shown a preferred embodiment of the invention in the accompanying drawings, in which—

Figure 1 is a vertical view partly in section of a band saw with the improved mounting applied thereto;

Figure 2 is an enlarged cross section of the lower or drive wheel mounting; and

Figure 3 is a fragmentary view taken on line 3—3 of Figure 2.

The band saw construction to which the present invention is applied is shown generally in Figure 1. This construction includes the base 11 and worktable 12. The generally U-shaped band saw and pulley housing 14 has a lower horizontal arm 15 and an upper horizontal arm 16, these arms being shown in vertical section in the drawing. This housing and mounting assembly is supported from the base 11. The lower wheel 18 is supported on shaft 19 carrying a pulley 20. This pulley 20 is shown as driven by belt 22 passing around pulley 24 which is secured to the shaft of the drive motor 25. The shaft 19 is supported in bracket 27, which is secured by bolts 28 to the lower saw and pulley housing portion 15.

The upwardly moving run 29 of the band saw passes up through the main vertical portion 14 of the band saw pulley housing and around the upper wheel 31. This wheel 31 is carried on a shaft which is supported in the adjustable block 33. This block is movable vertically on guide members 34 and may be adjusted upwardly or downwardly to properly tension the blade by means of rotation of the hand wheel 36. The guides 34 may have their lower ends moved inwardly and outwardly by the adjusting screw 38 and locked in properly adjusted position by the lock nut 39 in order to secure the accurate location of the wheel in a vertical plane.

The worktable 12 is shown as supplied with a slice thickness guide 40 which is pivotally supported by arm 41 from the fixed shaft 42. The general construction of the band saw assembly shown forms no part of the present invention, having been covered in my copending application previously identified herein.

The details of construction of the wheel mounting are shown in Figures 2 and 3. The shaft 19 is shown as rotating in ball bearings 44 and 45 supported in the bracket 27. The bearing 44 is located relative to the bracket 27 by the split ring 47 and is held in place by the bearing retainer ring 49, which is secured to the bracket 27 by screws 50. The shaft 19 is located relative to the bearing 44 by split rings 52. The bearing 45 is located relative to shaft 19 by the split rings 53.

The drive disc 55 is fixedly secured upon the shaft 19 by any suitable means, as, for example, by a brazing operation. This drive disc 55, as shown in Figure 3, is provided with a notch 56 adapted to receive the drive pin 58 which is secured to the wheel 18. The drive disc 55 has a radially extending flat face 60 which is engaged by a similar radially extending inner flat face 62 on the wheel 18. The wheel 18 is provided with a central axial opening 64 of a size to fit loosely over the outer end 65 of shaft 19. The inner portion of this opening 64 is enlarged to provide the circumferential shoulder 67. The outer portion of this opening 64 is outwardly flared, as shown at 69, to form a substantially conical seat.

The wheel-holding member 71 is threaded on the outer end 65 of the shaft and has a reduced inwardly extending portion 73 which extends through the central opening 64 in the wheel beyond the shoulder 67. This inner portion of member 71 carries the split ring 75 which is of such size as to engage the shoulder 67 when the member 71 is screwed off the end 65 of the shaft 19. This member 71 is provided with a convex surface 78 adapted to engage the flaring seat 69 of the wheel 18. The member 71 is provided, at its outer portion, with a diametrical opening 80 adapted to receive the removable rodlike member 82 which may be inserted in order to apply additional force to the member 71 when seating or unseating the wheel 18 relative to the face of the drive disc 55. The inter-relationship of the flaring seat 69 and the convex surface 78 is such that the wheel 18 may be properly and firmly seated against the face 62 of the drive disc 55 without the necessity of the parts being manufactured to such close tolerances as is required with other types of construction.

The heavy split ring 75 serves to draw the wheel 18 away from the drive disc 19 as the member 71 is screwed outwardly and this ring 75 engages the shoulder 67. The wheel may thus be positively removed, even though it has become stuck to the drive disc by foreign matter, such as food particles which may have reached the hub of the wheel in the use of the meat saw. The split ring 75 also makes parts 18, 71 and 58 an integral unit assembly upon removal, keeping the number of parts to be handled to one, rather than two. The unscrewing of the member 71 may be assisted by inserting the member 82 and tapping portions of that member in a direction tangential of the rotation of the member 71 to start that member, after which it may be readily removed manually by applying a rotating force to the member 82.

The construction shown, therefore, provides a simple and efficient method of manually mounting the wheels of the band saw by devices through the operation of which the wheel may be positively applied and positively removed for cleaning or for other purposes.

While the support of the lower wheel has been shown in detail in Figure 2, it will be understood that the support of wheel 31, the upper wheel, will be similar in construction, the only difference being that the upper wheel has a shorter shaft supported in the movable block 33.

The specific construction shown is to be understood to be illustrative only as it is capable of variation to meet differing conditions and requirements, and I contemplate such modifications as come within the spirit and scope of the appended claim.

I claim:

A wheel mounting for band saws or the like comprising a shaft, a drive disc secured to the shaft, a wheel having an axial opening therein fitting loosely about the shaft, the wheel having a circumferential shoulder about said opening adapted to face toward said disc, the wheel opening having an outwardly flared conical portion at its end opposite the disc, a wheel-holding member threaded on the end of the shaft, said member having a convex portion adapted to engage the flaring portion of the wheel opening to force the wheel against the drive disc, a portion of the member extending inwardly beyond the wheel shoulder and carrying means to engage said shoulder, said means being detachably secured to the holding member, and a detachable driving connection between the wheel and disc, the outer portion of the holding member extending beyond the shaft end and having a diametrical opening therethrough to receive a removable member for use in rotation of the member in attaching or removing the wheel.

EDWARD C. KARP.

REFERENCES CITED

The following references are of record in the file of this patent:

UNITED STATES PATENTS

| Number | Name | Date |
| --- | --- | --- |
| 173,126 | Little | Feb. 8, 1876 |
| 496,442 | Percy et al. | May 2, 1893 |
| 610,152 | Binns | Aug. 30, 1898 |
| 1,932,522 | Irgens | Oct. 31, 1933 |
| 2,442,697 | Krohm | June 1, 1948 |

FOREIGN PATENTS

| Number | Country | Date |
| --- | --- | --- |
| 564,228 | Great Britain | of 1944 |